Nov. 1, 1960     C. C. COOKE ET AL     2,958,160
APPARATUS FOR CONTROLLING DIMENSIONS OF LINEAR DRAWN BODIES
Filed Feb. 6, 1959     4 Sheets-Sheet 1

INVENTOR.
CHARLES C. COOKE
JOHN M. McCORMICK
BY
ATTORNEYS

Nov. 1, 1960 C. C. COOKE ET AL 2,958,160
APPARATUS FOR CONTROLLING DIMENSIONS OF LINEAR DRAWN BODIES
Filed Feb. 6, 1959 4 Sheets-Sheet 2

INVENTOR.
CHARLES C. COOKE
JOHN M. McCORMICK
BY
ATTORNEYS

Nov. 1, 1960 C. C. COOKE ET AL 2,958,160
APPARATUS FOR CONTROLLING DIMENSIONS OF LINEAR DRAWN BODIES
Filed Feb. 6, 1959 4 Sheets-Sheet 3

INVENTOR.
CHARLES C. COOKE
JOHN M. McCORMICK
BY
ATTORNEYS

United States Patent Office 2,958,160
Patented Nov. 1, 1960

2,958,160
APPARATUS FOR CONTROLLING DIMENSIONS OF LINEAR DRAWN BODIES

Charles C. Cooke and John M. McCormick, Toledo, Ohio, assignors to Owens-Illinois Glass Company, a corporation of Ohio Filed Feb. 6, 1959, Ser. No. 791,774

4 Claims. (Cl. 49—17.1)

The present invention relates to an apparatus for continuously drawing linear bodies from a mass of material in thermoplastic form and has for its primary object, the establishment and continuous maintenance of uniformity of dimensions in such bodies as drawn.

This present application is a continuation-in-part of our copending application, Serial Number 503,241, filed April 22, 1955, now abandoned.

Reference may be made to a copending application of Charles C. Cooke, Serial Number 460,015, filed October 4, 1954, for further elaboration upon the heating structures involved herein.

In accordance with the invention, the tube is drawn from a mandrel adapted to initiate the tubular form in a highly molten state. This initiation of the tube occurs under highly controlled temperature conditions and such control of these temperature conditions is maintained not only during the initiation, but up to that point where the tube formation reaches dimensional stability.

The maintenance of such temperature conditions coupled with the absence of air turbulence, permits obtaining of a very high degree of accuracy in the ultimate dimensions of the tube, mainly because there is but slight variation in glass temperature. Thus with added regulable automatic controls for the speed of draw, inflation pressure and wall thickness, the ultimate in continuous good dimensional control may be attained.

The primary object of this invention is to provide an operating combination of mechanisms whereby the temperature, rate of draw, diameter and wall thickness of a tube as continuously drawn, may be maintained continuously constant.

A further object is to provide a sensitive system wherein all of these controls are interlocked and synchronized in such manner that each will in effect anticipate any change or variation in the other and thereby maintain a balance between the control factors such as will lead to the elimination of dimension variables.

Another object is to provide the ultimate in automation production of glass rod or tubing.

Other objects will be apparent from the following description.

In the drawings:

Fig. 3 is a part-sectional plan view taken at the line III—III on Fig. 1;

The manufacture of various types of end articles from glass rod or tubing demands certain prime specifications such as accurate outside contour and diameter, accurate wall thicknesses, and a straightness through the length of either of these glass items. In the manufacture of tubing or rod, the major problem in the operation does not reside in the factors which produce slow temperature, dimensional or other changes, but in those which produce rapid variations, as, for example, variations in the diameter and/or wall thickness to the extent where one length of five feet of tubing can encompass both the maximum and minimum in diameter and wall thickness variations. Such rapid variations are produced by direct flame contact with the molten glass or by direct contact of transient or turbulent air currents and/or other factors which rapidly and detrimentally affect the viscosity of the glass as it is being processed.

To obtain these prime requisites, which are the essence of this present invention and in order to accomplish these desired results, it has been determined that it is necessary to prevent the molten glass, from which the tube or rod is made, from coming into actual physical contact with flame or the products of combustion generated by the heating means or with transient air currents. Flame or the products of combustion are not constant in temperature.

It has been further determined that air turbulence is also a major factor in contributing to the loss of dimensional control in the making of these linear products. Consequently, a structure has been provided in this present instance which prevents air turbulence and permits accurate temperature control of the glass through its formative stage.

Therefore, in this present instance, the molten glass is brought to a proper working temperature in a conditioning trough or channel directly heated by burners or otherwise, and from this channel it flows beneath a dam or control block into an enclosed channel structure which is heated externally by a muffle chamber construction. From this channel the glass flows down upon a rotating mandrel, the rate of flow thereto being adjustable. This mandrel is inclined from the horizontal, such inclination being determined generally by the composition of glass to be utilized in making either a rod or tube and also by the quantity of glass to be drawn therefrom.

The mandrel is enclosed in a muffle chamber, said chamber being heated by a series of separate muffles spaced along the length of the mandrel and with each muffle being independently controlled as to its particular temperature condition.

As previously stated, the molten glass is at no time subjected to flame or the products of combustion (which may vary in temperature) from the time it passes from the conditioning chamber and thence underneath the control block until it is completed into a tube or rod, However, it is subject to exact temperature control from the time it passes beneath the control block until completed into tubular form. Actually, the glass is subjected to four zones of temperature control from the time it leaves the original conditioning channel until it is completed into some particular tubular shape.

In the conditioning trough or chamber, the molten glass is brought up to a predetermined temperature, dependent upon glass composition, by the application of combustion or other forms of heating and from this chamber it flows under a dam into the first heat zone A which is an enclosed chamber and which is heated by a muffle structure arrangement. In this chamber the temperature of the glass is stabilized to the desired working temperature by the application of radiant heat, i.e., the temperature thereof being increased or decreased, depending upon the desired working temperature at its point of subsequent deposit upon the mandrel. From this enclosed chamber the glass flows beneath a control block arranged to control the volume of flow of glass from the heating chamber as it passes into a flow spout arranged over one end of a rotating mandrel. The flow spout is so positioned as to deposit the stream of molten glass near the top end of the mandrel and centrally of its rotating cylindrical surface.

When the glass is flowing down upon the rotating mandrel, it is entering into a chamber which is divided into at least three radiant heat zones spaced along the length of the mandrel, which zones are automatically and individually maintained at constant temperature to prevent erratic variations in the temperature of the glass flowing along the length of the mandrel. The first of these zones is maintained at the highest temperature, the second at a medium temperature, the third being at the lowest temperature and with the temperature of the glass through the length of the mandrel being maintained in some predetermined temperature gradient.

With respect to the final zone, it is actually an elongated extension of the three first mentioned temperature zones, and is designed to function as a means for preventing air turbulence and for bringing the temperature of the tube as drawn down to handling temperature without any erratic drop in such temperature, but with the temperature drop being quite possibly on the order of an exponential curve.

In reality what is really being accomplished is accurate control of the decrease in temperature of the glass in a quiescent atmosphere so that the molten glass will be provided to the nose or drawing end of the mandrel at a constantly maintained desirable temperature. In addition, such control provides that the temperature and the resultant viscosity of the glass at any transverse plane taken along the length of the mandrel will also be constant throughout the circumference thereof.

Such temperature control also provides a temperature differential as between the portions of the enclosed chamber which are at the higher elevations and those at the lower elevations, and such differential will remain constant under any specific operating condition or job.

With such a multiple muffle heating structure and the enclosed extension of the final zone, it is therefore possible to initiate and form such tubular or rod-like members in a quiescent atmosphere of controlled temperature and with the glass having a controlled temperature gradient through the length of the tubular formation. The provision of such a quiescent atmosphere eliminates any detrimental viscosity effects upon the glass normally due to exposure to variable flame temperatures and transient or turbulent air currents or draft, because under such enclosed conditions there is no possibility of direct flame contact or contact by transient currents.

As a consequence of such controlled and quiescent atmospheric conditions, the temperature of the atmosphere is accurately controlled to such a degree that a variation of only one or two degrees can occur at any point near the mandrel, thus providing a temperature in the glass at the drawing end of the mandrel that remains completely constant so far as commercial production conditions may be considered.

With homogeneous glass of uniform viscosity such constancy of temperature will with a constant rate of draw and a constant inflating air pressure produce tubing with uniform diameter and wall thickness.

One of the valuable attributes in this method is the catenary effect that is obtained in the drawing of these tubular items. The term "catenary" as herein used is considered to describe that portion of the tubing between the nose of the mandrel or sleeve and the first contact roller. The main use of this catenary is as a guide to the general operating condition by observation of its constancy during any particular operation.

Among the major items necessary to the accurate control of dimensions of a drawn tube or rod, we find that the glass temperature in the conditioning channel and the air temperatures at both ends of the mandrel are highly important, the air pressure admitted to the inside of the mandrel, the rate and constancy of glass flow to the mandrel, the constancy of the temperature and viscosity of the glass at the flow point and drawing end of the mandrel and the rate at which the glass is drawn from the mandrel.

It should be understood that the tube per se is actually made to controlled dimension in the space between the end of the mandrel and the point near its first contact with a drawing roll. In other words, with a given temperature and viscosity throughout the mass of glass at the end of the mandrel, with a predetermined rate of draw, and a constant air pressure, then the catenary formation can only produce so much tension against the viscosity of this workable piece of glass, and this in combination with accurate temperature controls permits a tube or rod of a controlled diameter and wall thickness to be brought into existence.

In order to obtain and maintain these highly desirable features, it is the premise of this invention to provide in addition to the quiescent atmosphere structure a set of controls which will automatically sense any variation in any one of these mentioned conditions and which will proceed automatically to correct same as well as anticipate the needed correction to the other conditions to automatically maintain a balance in the operation.

To accomplish this the temperature throughout the length of the forming zone will be automatically maintained constant for any specific operation by automatic temperature control of the muffle zones.

As to the control of the variables two separate control systems are provided, one for wall thickness and the other for tube diameter. Separate sensing devices are used to measure the variables of these two factors. From each sensing device an electrical signal is taken to the control units, which are units of the type usually used for temperature control. The automatic control members for the tube inflation pressure, rate of draw, diameter and wall thickness will be adjusted for the specific dimensions and any variation from such dimensions will automatically cause the electronic mechanism to adjust the means controlling the specific variation and to compensate among the other controls, for any such specific change. For example, if the tube diameter should increase, due primarily to the slowing down of the rate of draw, then the sensing roller device for diameter control will detect the increase and immediately the first electronic control system will be set in motion to adjust the inflation pressure and consequently, reduce the diameter. Consonant with this adjustment of the pressure, there will also be an anticipatory adjustment of the rate of draw either through the interconnected control systems or the second control device will be impulsed by the sensing capacity of the X-ray wall thickness control device. In other words, the control action of either of the control systems has a second order effect on the variable controlled by the other system.

As a further example, suppose that the rate of flow of glass is slightly increased so as to cause an increase in wall thickness of the tube as drawn. The thickness sensing device, acting through its control, will speed up the rate of draw and thin out the tube wall with a consequent change in diameter. In order to anticipate this latter effect there is provided an additional channel from the output of the wall thickness control to the input of the diameter control. This enables the diameter control device to begin to compensate for the reduced diameter even before a reduction is sensed. In a similar manner a cross channel is provided from the output of the diameter control to the input of the thickness control. In each of these channels there is provided a gain control so that the amount of corrective action can be adjusted to provide the minimum of disturbance. With these cross channels operating both of the control systems are interlocked and the whole system then acts as a single control system adapted to automatically balance and regulate the rate of tube draw and the inflation pressure in proportion to and with relation to each other to thereby automatically control the diameter and wall thickness of the tube as drawn.

Figures 1, 2, 7, 10:
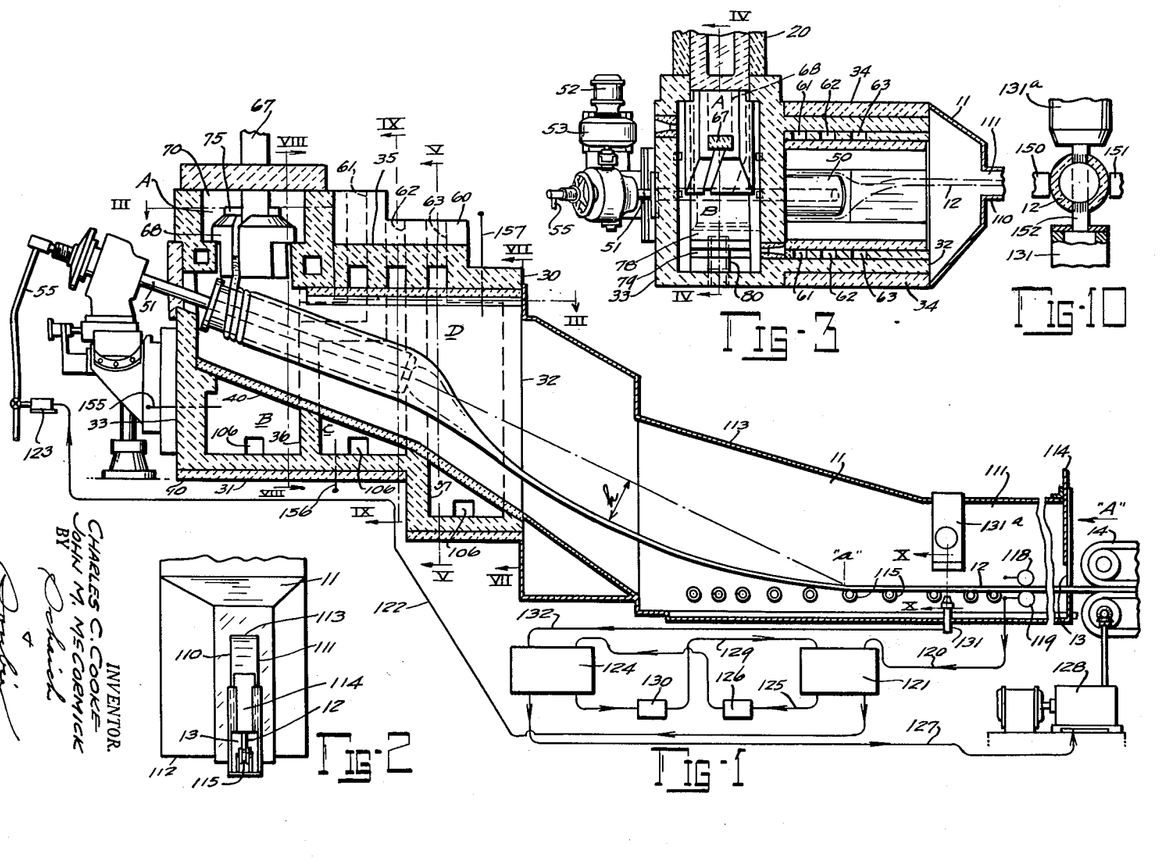
Fig. 1 is a sectional elevation through the length of the tube alley illustrating the complete enclosure for temperature control and separation of the glass from the products of combustion.
Fig. 2 is an end view of the catenary tunnel or enclosure viewed in the direction of arrow A on Fig. 1.
Fig. 7 is an end view of the muffle structure taken at line VII—VII on Fig. 1.
Fig. 10 is a part-sectional view taken at line X—X on Fig. 1, illustrating how the X-ray beam is continuously intercepted by a predetermined portion of the wall of the tube so that the beam absorption rate will be constant for a given wall thickness.

Referring in particular to Figs. 1 and 2, there is disclosed an apparatus for carrying out this method which comprises a tube drawing alley structure composed of a plurality of temperature controlling structures arranged in abutting and enclosed continuity through the length of the alley.

Figures 4, 6:
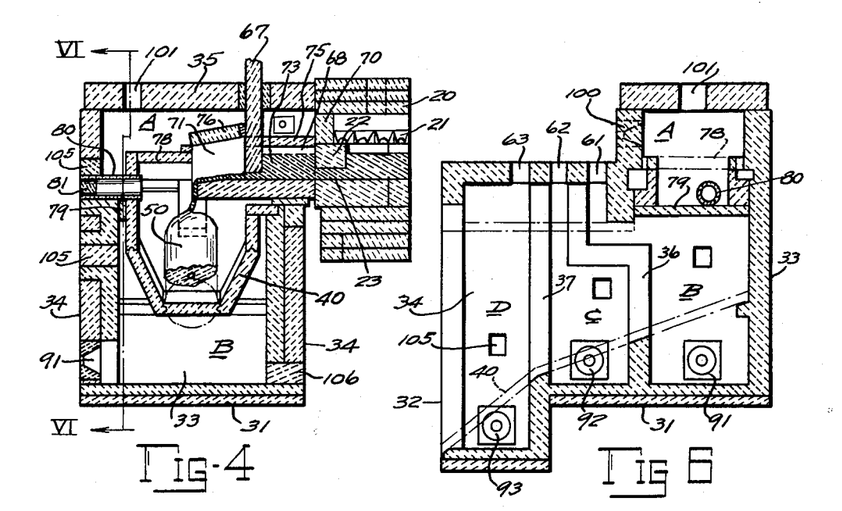
Fig. 4 is a cross-sectional elevational view taken at the line IV—IV on Fig. 3 illustrating the comple muffle enclosure of the glass.
Fig. 6 is an elevational view in cross-section taken at line VI—VI on Fig. 4 showing the three zones of muffle structure and their separate burner arrangement.

The first section 10 of this alley is a heating section comprised of a plurality of individual muffle structures A, B, C and D (Figs. 1 and 6). Attached to and extending outwardly therefrom is a further alley enclosure 11 which is adapted to utilize the heat from the muffles A, B, C, and D in such manner as to permit the tubular member 12, as drawn therethrough, to be reduced in temperature to a point where dimensional stability obtains.

The enclosure 11 has an opening 13 at its extreme outer and lower end through which the formed tubular member 12 is drawn by a mechanism 14 of the usual type such as, for example, as disclosed in the Danner Patent 1,220,201.

A melting and fining tank of any of the well known types (not shown) provides molten glass to a conditioning trough or channel 20 (Figs. 3 and 4) where combustion burners 21 bring the temperature of the glass to the degree of heat required for the particular size of tube to be drawn and to fit the composition of the glass being used. The usual automatic pyrometer and gas burner controls (not shown) are utilized in this channel 20 to maintain the desired temperature constant therein.

Referring particularly to Figs. 1, 2 and 3, the muffle heating portion of the apparatus includes a closed heating structure 30 having a generally rectangular cross-section and including a bottom wall 31, a front wall 32, a rear wall 33, side walls 34, and a top wall 35. The furnace includes transverse walls 36, 37, 75, 76, 78 and 79 which divide the furnace into the muffle chambers A, B, C and D.

Figure 5:
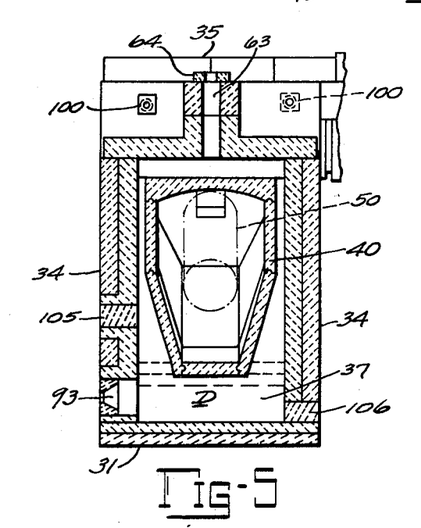
Fig. 5 is a cross-sectional elevational view taken approximately at line V—V on Fig. 1 and shows the mandrel enclosure and muffle structure of the third muffle zone.
Figure 7:
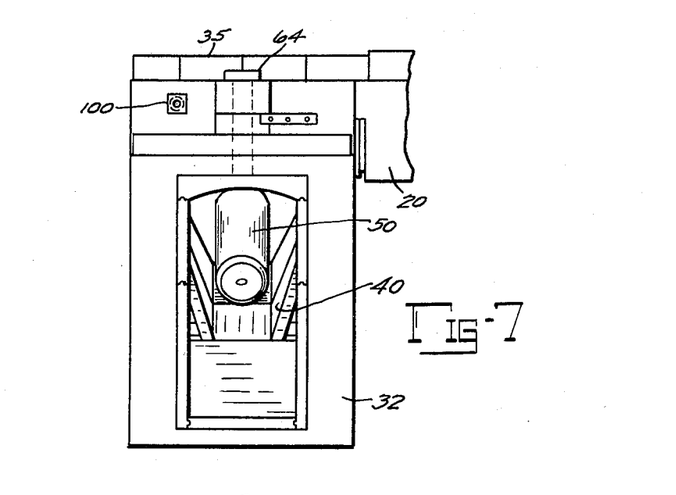
Figure 8:
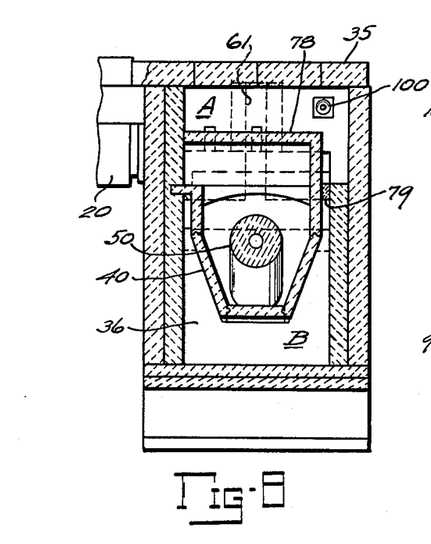
Fig. 8 is a cross-sectional view taken at line VIII—VIII on Fig. 1 showing the first muffle zone as encompassing the flow spout.
Figure 9:
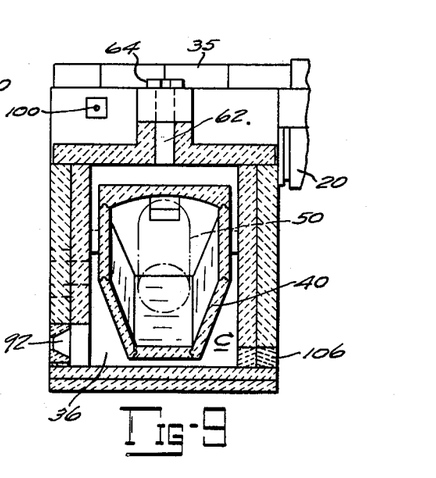
Fig. 9 is a cross-sectional view taken at line IX—IX on Fig. 1 and shows the second muffle zone structure.

A generally frusto-conical hollow housing 40 extends longitudinally of the furnace and is set in openings through the transverse walls 36 and 37 and the front wall 32. As shown in Figs. 5, 8 and 9, the housing 40 is generally hollow in cross-section.

Referring to Figs. 1 and 3, a mandrel 50 is mounted within the housing 40 on a shaft 51 which extends through the rear wall 33. Means including a motor drive 52 and gear reduction 53 is provided to rotate the mandrel. In addition, an air line 55 is provided to introduce air through the interior opening of the mandrel (Fig. 1).

The transverse walls 36 and 37 divide the furnace into the three zones B, C and D, extending longitudinally along and surrounding the housing 40. A stack block 60 is mounted on top of the furnace and has stack openings 61, 62 and 63 individual to the zones B, C and D, respectively. Stack control blocks 64 are provided on each stack of draft control.

Referring to Figs. 4 and 8, the housing 40 has a portion cut away near the rear wall to form an opening through which glass is introduced to the mandrel 50. A gate block 67 is positioned in the opening to control the flow of molten glass through channel block 68 positioned within the furnace.

As shown in Figs. 1, 3 and 4, the channel block 68 includes a rear wall 70, gate block 67 and side walls 71, 72, providing a channel reservoir area 73. Openings are provided in the lower part of the rear wall so that the glass may flow through the channel block 68 (Fig. 4). The gate block 67 is suspended in the reservoir area 73 to control the flow of molten glass through the channel block. The gate block 67 is movable vertically by means not shown.

Referring to Figs. 1, 4 and 3, a cap 75 is positioned over the top of the channel block 68 and the opening in the housing 40 to form the muffle zone A thereby to prevent the direct impingement of flames or other gases upon the molten glass. The cap 75 includes a top wall 76 extending into flush relationship with the gate block 67 of the channel block 68 and the transverse walls 71 and 72 of the channel block 68. A side wall 77 extends downwardly into contact with the housing 40 and into contact with the transverse wall 36. A bridge block 78 and filler block 79 completes the isolation of the muffle zone A from the interior of the housing 40 and from muffle zone B. A tube 80 is provided through the side wall of the cap in order to provide an inspection opening. A plug 81 normally closes the opening in the tube.

Burners 100 in the side wall provide combustion heat to zone A external of the channel reservoir 73 to maintain the molten glass therein at a stabilized operating temperature. A stack opening 101 provides an exit for the combustion gases. Observation blocks 105 are provided in one wall of each of the zones A, B, C, and D for structure observation, and clean-out blocks 106 are also provided in the bottom of each of these zones.

The enclosed extension 11, which extends outwardly from front wall 32 of the furnace structure is provided with sides 110 and 111, a bottom 112 and roof 113. An adjustable door 114 provides means whereby the exit of heat and inflow of air may be controlled. A series of rollers 115 are provided for support of the tubular member 12 when it reaches the point of stability.

The only heat supplied to this extension 11 is that which flows from the housing 40 under natural thermal flow and by radiation from the cooling glass.

In the operation of this device, molten glass is supplied from the usual melting and fining furnace to the conditioning chamber 20 where said glass is subjected to a blanket of radiant heat by the burners 21 to bring the glass to the desired temperature. For example, if the ordinary soda-lime glass is to be used, the temperature in chamber 20 may be brought to a temperature of approximately 2150° F. The glass flows from chamber 20 under the dam 22 through opening 23 into the reservoir 73 formed in the channel block 68.

At this point heat is supplied by the burners 100 to completely surround the enclosed reservoir 73 and allows the temperature of the glass at this point to be dropped under accurate control to the desired working temperature at the flow point. From this reservoir 73, the molten glass flows under the gate block 67 and is deposited upon the upper end of the rotating mandrel 50 at precisely the desired working temperature for this point where the tube formation is initiated. As the molten glass leaves the reservoir 73 and flows under the block 67, it enters into a completely enclosed muffle heated chamber provided by the housing 40.

It is the desired objective at this point to provide molten glass to the nose or drawing point of the mandrel at the precise temperature and uniform viscosity which is conducive to the drawing of the glass into tubular form of predetermined diameter. This can only be accomplished by control of the temperature of the molten glass between the point at which it is deposited initially upon the mandrel and the point where it is withdrawn from the mandrel. Such control is accomplished in this apparatus by the provision of a plurality of individual and separate muffle zones B, C and D formed externally of the housing 40. As each of these zones is independent in their temperature control (automatic by commercially available control equipment) it is possible, therefore, to provide radiant heat to the glass on the surface of the mandrel in a controlled gradually decreasing manner through the thermocouples 155, 156 and 157.

For example, if the soda-lime glass is deposited at the top end of the mandrel at approximately a temperature of 1965° F., it will be found that the temperature midway of the length of the mandrel will be approximately 1775° F., and the temperature of the glass at the nose or drawing point of the mandrel will be approximately 1650° F. In this manner it is possible to have a constant temperature at any given transverse plane along the length of the mandrel, said temperature being conducive to the obtaining of the desired drawing temperature through a transverse plane at the end of the mandrel.

It is an essential requisite of this method that the temperature and viscosity of the glass in the transverse plane at the end of the mandrel, from which the tubular formation is drawn, be completely equalized and uniform throughout the entire area of said plane and in particular the outer surface or skin areas should be equalized in temperature in order that the stretching of said skin, due to the catenary action, will be at equal rates throughout. Otherwise, any variation in temperature will cause a change in viscosity. For example, if on one side of this transverse plane area, the temperature in a given spot should be 10° higher than the remainder of the glass in said plane, then the viscosity of said higher temperature glass is reduced in the proportion of ten percent compared to that of the other glass in said plane. This difference or non-uniformity in viscosity will result in a variation in the tubular formation dimensions, either in its wall thickness, the diameter or both. Consequently, it is essential that this area be free from the detrimental effects of erratic flame contact or any transient drafts which will upset the desired temperature balance.

It is assumed that it is understood the normal starting operation of using a bait or some similar means has already progressed and that the tubular formation is under the control of the drawing device 14.

By accommodating the speed of the drawing mechanism 14 to the particular dimensions of the tube to be drawn, the composition or type of glass and the temperature and viscosity of the glass at the nose of the mandrel, it is possible to create a zone of longitudinal tension between the end of the mandrel and the point where the tubing reaches its point of dimensional stability.

With any given rate of draw of glass from the nose of the mandrel, a catenary formation will prevail between the end of said mandrel and the point where the drawn tube begins to move in its horizontal drawing plane. The height $h$ of this catenary will, of course, vary with any temperature change in the glass, the types or composition of glass, the dimensions, for example, the diameter and wall thickness of the particular tube being drawn, the volume and pressure of air being supplied internally of the tubular member, and the rate of draw existing at the time.

With the temperatures mentioned just above in connection with soda-lime glass, the tube will reach a point of stability at about 800° F., approximately at the end $a$ of the catenary or slightly therebeyond.

It will be observed that no flame heat is directly supplied to the interior of the extension 11 of the closed drawing alley, and for this reason the temperature drop in this area will be in some proportion to any given vertical point on the length of the tubular member 12. In other words, there will actually exist a horizontal temperature gradient through the length of the total enclosure which is comparable to the temperature gradient existing through the length of the tube from the flow point to the point of stability thereof, and also there will exist a temperature gradient vertically through the height of said enclosure.

Figure 11:
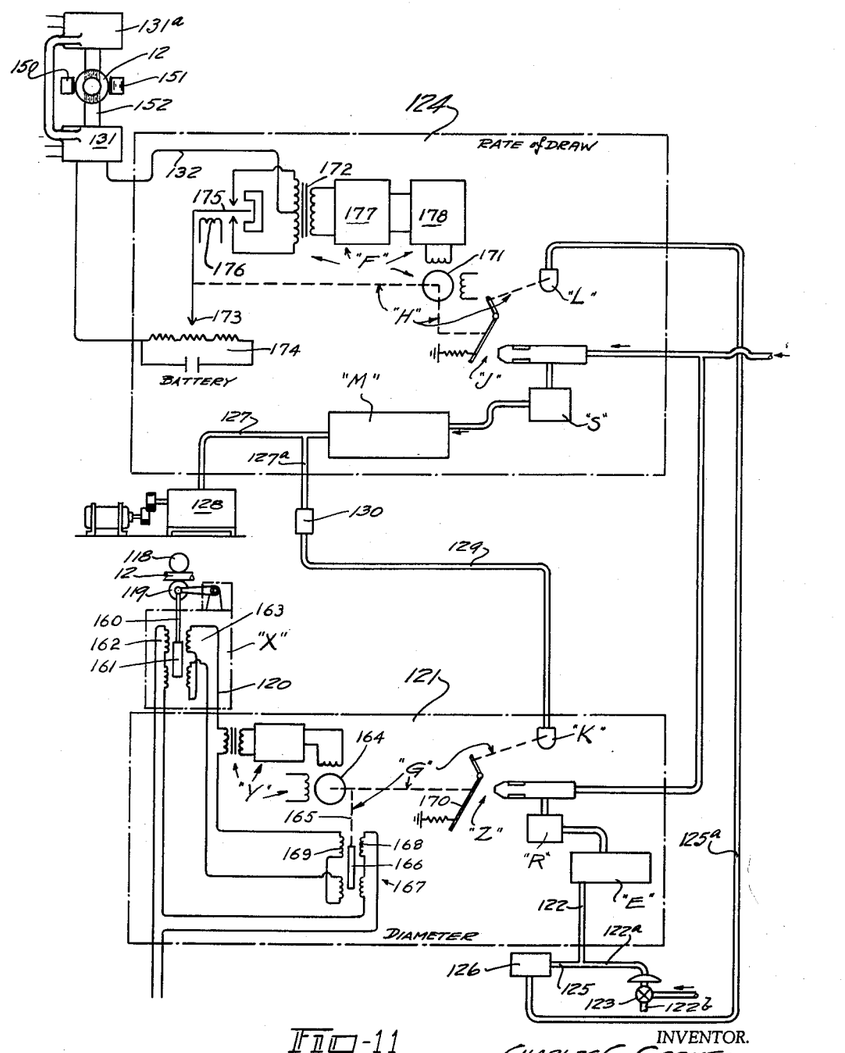
Fig. 11 is a schematic view of the electrical and pneumatic circuits of the control mechanisms.

Referring specifically to Figure 11 which schematically illustrates the control mechanisms, it is to be noted that in order to provide adequate control of the operation of the machine for drawing a tube member 12, a pair of sensing rollers 118 and 119 are positioned on opposite sides of the drawing tube and the roller 119 is mounted for pivotal movement toward and away from the roller 118. The roller 118 is mounted for rotation about a fixed axis and the roller 119, being mounted on a lever, will move relative to roller 118 whenever the diameter of tube 12 changes from a desired or determined diameter. The extent of movement of the roller 119 relative to roller 118 is sensed by transducer X. The transducer X is in the form of a differential transformer having a core 161 attached to the roller 119 by means of a shaft 160. The movable core varies the coupling between primary windings 162 and secondary windings 163 connected in series opposition. Movement of the core 161 will result in a differential coupling between the primary and secondary windings of the transformer which is a signal of a phase depending upon the direction of movement of the core relative to a central position. The magnitude of the out-of-balance voltage resulting from movement of the core 161 depends upon the extent of movement of the core 161. The out-of-balance voltage is received by a phase sensitive amplifier Y which provides the error signal for the servo motor 164. The servo motor 164 will thus be energized for rotation in one direction or the other depending upon the phase of the signal received by the transformer Y. The servo motor 164 is mechanically coupled by member 165 to a core 166 of a second differential transformer 167 having primary windings 168 and which may be an exact copy of transformer X or may be provided with windings giving a different ratio. These units X and Y are obtainable from The Automatic Temperature Control Company, Inc., Philadelphia, Pa. This unit is known as their "Atcotran Differential Transformer Unit" and is shown in their catalog R–31, dated February 1952, on pages R31–6 and R31–12, Figs. 19 and 54, respectively.

Transformer 167, having secondary windings 169 in series opposition, is electrically connected to the differential transformer X in a well-known manner such that the position of the core 161 resulting from a change in the diameter of tube 12 will be reflected in the position of the core 166 in the differential transformer 167. When the two cores 161 and 166 are similarly positioned the phase sensitive amplifier Y receives no signal and thus the servo system is balanced. The output of the servo motor 164 is also coupled to the flapper 170 of the flapper nozzle pneumatic control device Z by means of a coupling link G as specifically shown in Fig. 11. The flapper nozzle pneumatic control devices J and Z and their associated components E and R and M and S, respectively, may be obtained from Minneapolis-Honeywell, Philadelphia, and are shown and described on page 48 of their Catalog #1531 dated 1953. Obviously, the servo motor 164 output, which is a function of the tube diameter changes, could as well be used to operate a potentiometer in an electric control system or could be coupled to a mechanical controller or indicator. The control function attributed to movement of the flapper is the control of the air being blown into the interior of the tube 12. The operation of the control while obvious from Fig. 11 will be explained generally.

Air is fed under pressure to the nozzle of the flapper nozzle device Z and the resultant back pressure, depending upon the position of the flapper in relation to the nozzle, is received by pneumatic control unit E through pilot relay R and provides an output pressure which is a function of the above mentioned back pressure. This output pressure is directed through lines 122 and 122$^a$ to a pneumatic control valve 123 in the line 122$^b$. The positioning of the valve 123 results in a control of the air being blown into the interior of the tube 12. This explains the function of the sensing and control unit 121 which provides close control of the diameter of tube 12 being formed. These sensing rollers are adjusted to the desired diametrical dimension of the tube and if, for example, this desired dimension is exceeded, the sensing rollers signal the control 121 and it in turn and through line 122 actuates a valve mechanism 123 to reduce the inflation pressure to the inside of the drawn tube. This first control 121 is interlocked to a second control 124 through the cross channel line 125 and attenuator or gain control 126. Because of this interconnection, the second control 124 will be actuated to anticipate a change in wall thickness by correcting the rate of draw by a signal through line 127 to the speed control 128. Wall thickness is definitely a first order resultant of drawing speed.

The second cross channel line 129 and its attenuator gain control 130 also interconnects the two controls 121 and 124 and provides the needed second interconnection between these controls 121 and 124 to permit their actuation and operation as a single unit to maintain a balance in the operation of the mechanism since diameter and wall thickness are not physically independent. The attenuators 126 and 130 are commercially available units which as purchased are adapted to receive the output from controllers 121 and 124 and produce a signal which is proportional to that output. This signal, fed back to the other controller, will initiate a control change which, for example, will modify the diameter of the drawn tube by an amount which would be caused by the change in drawing speed being called for by the thickness controller. The proportioning factor will vary from size to size of tube and must be established by and from experience. These attenuator units are available from several sources, for example, Minneapolis-Honeywell of Minneapolis, Minn., and are known as their "Tel-O-Set" automatic ratio relays. These units are illustrated in their Bulletin 8410, and specification sheets 769–1 and 770. They may also be obtained from The Foxboro Company, Foxboro, Massachusetts, and they designate them as their "Consatrol" units.

As a further example of the control operation, suppose that the rate of flow of glass is slightly increased so as to cause an increase in wall thickness of the tube as drawn. Referring to the top portion of Fig. 11, there is illustrated apparatus for detecting variations in wall thickness of the tube 12 from the desired wall thickness and means for controlling the wall thickness in response to the detected changes in thickness from the preselected or desired thickness. The detecting apparatus takes the form of an X-ray density gauge which is a commercially available unit manufactured by the General Electric Company, Milwaukee, Wis., and is illustrated and described in their catalog "Direction SP-950." The X-ray density gauge takes the form of a radiant energy source 131$^a$ beamed through the tube 12 as illustrated at 152 and received by the conventional X-ray or radiant energy pick-up 131. In order to insure that the tube 12 traverses the beam 152, guide members 150 and 151 are positioned on either side of the tube 12. The pick-up 131, in actual practice, is a differential radiant energy indicating device and provides an electrical output signal responsive to the amount of difference in radiant energy received from the source 131$^a$. The source 131$^a$ has two beams that are picked up by the pick-up 131 and one beam is intercepted by the tube 12 under investigation, while the other beam is intercepted by a standard to which the tube 12 is being compared. The X-ray comparator 131 provides a milli-voltage output which is a function of the change in mass of tube 12 from a preselected desired mass. This output voltage is fed through lead 132 to a standard null balance D.C. potentiometer device diagrammatically shown at F, well known to those familiar with the electrical art. The lead 132 is connected to the midpoint of the primary winding of transformer 172. The ends of the primary windings are alternately connected to the adjustable wiper 173 of potentiometer 174 by means of a vibrating contact 175 which is vibrated by the energizing coil 176 connected to a source of alternating current. The transformer 172 has its secondary connected to a voltage amplifier 177 and power amplifier 178 which provides a direction and magnitude signal to one phase of the two phase servo motor 171. The output of the servo motor 171 of null balancing potentiometer device F is mechanically coupled to the flapper of the flapper nozzle unit J which functions through components S and M essentially in the same manner as in unit Z of the diameter monitoring unit 121.

Air under pressure directed to the nozzle of the unit J provides a back pressure depending on the position of the flapper in relation to the nozzle through pilot relay S and this back pressure is fed to pneumatic control unit M which in turn provides a pneumatic output depending upon the input pressure therein. This output pressure is communicated to the speed changer or control unit 128 of the tube drawing drive mechanism by means of a conduit 127. The speed changer unit 128 is one manufactured by the Link-Belt Company, Chicago, Illinois and is known as a variable ratio mechanical speed changer and is illustrated and described in their catalog #2274, page 72 thereof.

When a correction is made, for example, to the rate of draw, the diameter of the glass will readily change, necessitating a new control index setting with respect to the diameter controlling mechanism. Because of the change of index setting, it then becomes necessary to reposition the index setting of the rate of draw control in some lower order of magnitude, for example, if the X-ray comparator recognizes a change in the mass of glass, the mechanism controlled by the comparator will make the necessary correction for this to the rate of draw. By changing the rate of draw, it will not only change the mass, but will also change the physical dimensions of the drawn member, namely, the diameter thereby requiring the diameter controlling mechanism to hunt or seek a new control index setting.

In order to prevent excessive hunting or the possibility of an off rate or off balance condition as between rate of draw and diameter the two control units 121 and 124 have related pneumatic control elements K and L. These control elements K and L are obtainable from Minneapolis-Honeywell Regulator Company of Philadelphia, Pa., their Brown Instrument Division and are known as their "Indexet" or Pneumatic Remote Index Setting and illustrated and described in the catalog 89–1 dated 1943. The control element K receives the pneumatic signal from the pneumatic control mechanism M through the intermediary of a pressure ratio relay 130. The member K essentially is a set point pressure responsive motor having a mechanical output coupled to the flapper or flapper nozzle device Z. In a like manner the control element L receives a pneumatic signal through the intermediary of a pressure ratio relay 126 and has a mechanical output coupled to the flapper of flapper nozzle device J. The X-ray or other thickness sensing device 131, 131$^a$, acting through line 132 to the control 124, will by signal through line 127 to the speed control 128 increase the rate of draw, thereby thinning out the tube wall and affecting diameter of the tube to some extent. In order to anticipate this latter effect the provided additional channel 129 leading from the output of the wall thickness control 124 to the input of the diameter control 121, enables the diameter control device 121 to begin to compensate for the reduced diameter even before a reduction therein is sensed. These control units 121 and 124 are commercial units and as received they are adapted to accept an input signal for control of a valve or other device. These control units may be obtained from Minneapolis-Honeywell Regulator Company and are known as their "Air-O-Line" or "Electronik" controllers as disclosed in their Bulletin 1531 referred to hereinbefore. These units include adjustable proportioning, integral and derivative controls such as are commonly supplied in temperature control devices. Since these controls include these adjustable features which permit proportioning and integrating the signals received, therefore, it is possible with respect to the tube dimensions to proportion the control action to the variations. Variation in wall thickness modifies the setting of the speed changer ratio through either pneumatic or electrical control devices such as the "Air-O-Line Controller" or the "Electronik Controller." Variation in tube diameter modifies the setting of the inflating air pressure control through either pneumatic or electrical control devices such as the "Air-O-Line Controller" or the "Electronik Controller." In addition, a change in signal due to either a diameter or wall thickness variation produces a proportioned signal which, superimposed on the signal from the other attribute, creates a sufficient change to cause a corrective action to be taken by that controller. If the mass flow is constant, the diameter and wall thickness vary inversely but in proportions varying with the ratio of the desired diameter and wall thickness. Hence the proportion of feed back from each control element to the other must be varied according to the demand of the particular job or tube being produced. In a similar manner the cross-channel 125 is provided from the output of the diameter control to the input of the thickness control to anticipate a change in thickness. In each of these channels there is provided gain controls or attenuators 126 and 130 so that the amount of corrective action can be adjusted to provide the minimum of disturbances. With these cross-channels operating, both of the control systems are interlocked and the whole then acts as a single control system.

For the ultimate in control it is desirable to have the sensing devices as close as possible to that point at which the tube reaches a rigidity sufficient to retain fixed dimensions. However, it is contemplated that these sensing devices may be positioned at any desired point along the length of drawn tubing.

In Fig. 10 the wall thickness sensing device 131 and 131a is shown in connection with opposing guides 150 and 151 which maintain the tube in alignment with the beam 152. The comparator units 131 and 131a are units which compare the absorption of two X-ray beams and thereby produce a variation in voltage proportional to the tube wall thickness. This comparison is accomplished in effect by splitting the X-ray beam into two parts, one of which passes through a standard sample and the other through the tubing being analyzed. These are commercially obtainable units described in "Direction SP-950" referred to hereinbefore and are known as X-ray density gages with CdS detector cells. In this manner it is possible to have the beam continuously interrupted by a cross-section in which the mass remains constant until actual variation in wall thickness occurs. Thus, with any change in mass the X-ray sensing device will pick up the change and actuate the control 124 to regulate rate of draw or pressure of inflation or both, as the situation may demand.

In the utilization of this control mechanism the operator will first adjust the X-ray comparator 131 and 131a and the sensing or calipering rolls 118 and 119 to a previously made control sample of the desired drawn tube. This sample of glass tubing will have the desired outside diameter and the desired wall thickness. By such adjustment these two sensing instruments will thus be tuned to sense any variation from the dimensions of the sample.

Each controller 121 and 124 has a mechanism K, L, respectively designated as an index setting or control point which is originally manually set by the operator but which is capable of being repositioned by the controlled air output of the automatic ratio relays 126 and 130. However, each relay repositions only its own controller, namely, ratio relay instrument 130 repositions controller 121 and the ratio relay 126 repositions only the controller 124. The index setting mechanisms are a part of the controllers 121 and 124.

As a more precise or concrete illustration of the operation of this control mechanism the following is set forth.

Whenever the diameter of the drawn tube varies from the index setting of the controller 121, which would be a deviation from the ultimately desired final diameter, the roller caliper 119 will be so actuated as to indicate this deviation or unbalancing and will send a signal from a linear variable differential transformer X formed as a part of the sensing roller 119. Through this mechanical action provided by the roller caliper 119 this signal is fed through lead 120 to the null-balance servo-amplifier Y which forms a part of the controller 121. This electric unbalance or error signal is converted by the controller 121 to a pneumatic signal by mechanical linkage G actuating the flapper nozzle unit Z which is operative with respect to the index setting member K of the controller 121. The controlled air output from the pneumatic control unit E of the controller 121 is then directed to the air control valve 123 through line 122 and 122a and provides the means for actuating valve 123 to thereby make the corrective change in the internal air pressure supplied through line 122b to the tube being drawn. At the same time the control pressure is also simultaneously directed through line 125 to the automatic ratio relay 126. The function of the automatic relay 126 is to provide a controlled air pressure through the conduit 125a to the index setting member L of the controller 124. This controlled air pressure is in a ratio to the output pressure of the controller 121. Thus it provides a means for repositioning the control setting index of controller 124. This pneumatic signal is of a lower order of pressure but is in direct ratio to the pneumatic output signal of the controller 121. These index setting control members are manufactured by The Brown Instrument Division of Minneapolis-Honeywell Regulator Company of Philadelphia, Pennsylvania, and are known as their "Indexet" or the remote index setting assembly or unit referred to hereinbefore.

The X-ray comparator 131 is a mechanism which recognizes the mass of the product which is passing through the scanning head and provides a millivoltage output which is in proportion to the mass of the glass and is directed through the line 132 to the controller 124. The mechanism F of the controller 124 is a standard null-balance D.C. potentiometer well known to those familiar with the electrical art. The output voltage of the amplifier of this D.C. potentiometer is converted by the controller 124 through the action of a mechanical linkage H to the flapper nozzle unit J to a pneumatic control signal which is operative with respect to the index setting member L of the controller 124. This pneumatic control signal is then conducted through a pneumatic control unit M in the controller 124 through the conduit 127 to a pneumatic diaphragm mechanism within the speed changer 128. This mechanically controls and regulates the drawing rate of the drawing mechanism. This same pneumatic control signal from the controller 124 is also directed through line 127ª to the ratio relay 130 whose function is to provide a control signal of a low order of pressure which is in direct ratio to the pneumatic output signal of the controller unit 124. This output signal passes through the conduit 129 and functions to reposition the control index setting member K of the controller 121.

The reason these mechanism are in an interconnected circuit is that whenever a correction is made, for example, to the rate of draw, then the mass of glass will inherently change, thereby necessitating a new control index setting with respect to the diameter controlling mechanism. Because of this change of index setting, it then becomes necessary to reposition the index setting of the rate of draw control in some lower order of magnitude. For example, if a slight temperature change should occur in the mass of glass at the draw point, either or both of the sensing elements would recognize the change inherent to such temperature variation. For example, if the X-ray comparator recognizes a change in the mass of the glass, the comparator's associated controlling mechanisms will make the necessary corrective action to the rate of draw. By changing the rate of draw, it not only will change the mass of the glass but will also change the physical dimensions of the drawn member, namely, the diameter, thereby requiring the diameter controlling mechanism to seek a new control index setting. With this requirement of the new index control setting the internal pressure of the drawn member must be compensated in either direction depending upon the direction in which the change has been moving. However, major rapid change cannot be tolerated. Whenever a change occurs in either of the index control settings, then the opposite control setting must be changed in a compensating manner but such change desirably is in increments of a low order. Therefore, under such a changing condition, each index control setting will compensate against the opposite and in alternation until such time as they have both reached the original setting for any given diameter and wall thickness of a drawn tube.

Thus a change in either the diameter or the mass of the glass will set up a corrective action through the respective controllers 121 and 124 to the final control element which may be either the rate of draw or the internal air pressure or both. In addition to the major control function of the respective controllers 121 and 124, they each provide an additional control function of a lower order but in continuous proportion which repositions the original index setting of the opposite controller. Thus a dynamic balance can be obtained between the rate of draw and the internal pressure to thereby obtain and maintain the ultimately desired diameter and wall thickness of the tubular member as drawn.

It has been definitely established that in this structure the excellent commercial results being obtained result directly from the combination of the heated muffle structure and the completely enclosed alley. It should be apparent that the muffle structure without the closed alley could not be completely effective to the ultimate of desired end results because the tube during its formative period, namely, during the catenary formation, would be accessible to transient air currents or drafts.

The desired end results actually being obtained on a commercial basis are (a) better quality glass with its resultant greater pack of tube, (b) greater quantity of tube, and (c) a perfection of dimensional control of the tube far beyond any results heretofore obtained. The novelty that makes such results possible reside in the arrangement of the tube drawing structure wherein the tubular formation is initiated under controlled temperature conditions and drawn in catenary form to its final stable dimensions in a closed chamber provided with a heated quiescent atmosphere free from any open flame, and wherein the diameter and wall thickness of the tube is controlled as drawn by providing a control of the temperature of both the glass and said atmosphere in a vertical and horizontal gradient from a maximum temperature downwardly through the height and length of the chamber, to a temperature conducive of dimensional stability in the tube.

It is within the purview of this invention to utilize the disclosed method in the production of solid round or other cross-sectional shapes or rod formations. In this connection it is to be noted that when the inside diameter of a tube formation is reduced to zero, the former prevailing attributes of wall thickness then become those of diameter, i.e., the mass formed by the two walls then becomes the mass formed by a single wall. Such mass then becomes the indicator or actuator in connection with the X-ray device 131 and 131ª or any other similar device.

The potential of controlling the diameter of solid tubular formations, such as rods, etc., resides essentially in sensing the diameter and through the provided cross linkage in the controls 113 and 121 to maintain the adjustment of the rate of draw speed or by sensing thickness or mass through the X-ray or other gauge to directly control the draw speed.

The terms "tube" and "tubular" as utilized with the context of this specification are to be interpreted as including both hollow and solid lineal formations. The terms "tubular form" and "tubular member" as used in the specification and claims are so used as to distinguish as between the unfinished tube and the finished tube. For example, the term "tubular form" indicates that the glass has not yet reached its final dimensions.

Modifications may be resorted to within the spirit and scope of our invention.

We claim:

1. An apparatus for continuously producing a lineal tubular glass member of extended length including means for continuously initiating an extended tubular form of molten glass supported on and along an extended tubular mandrel, said tubular glass form ending in a mass of molten glass at the draw point end of said mandrel and from which the final tubular glass member is drawn, means to rotate said mandrel and tubular form about an axis extending through the length thereof to thereby maintain said tubular form and the mass of glass at said draw point, means comprising a series of contiguous radiant heat zones extending along said axis to provide a gradually reduced temperature gradient in and along said tubular glass form throughout its length and also to maintain the temperature of said tubular form constant at any transverse plane along said length and at said draw point, means for continuously drawing an unsupported tubular formation away from said mass of glass at said draw point, means to continuously supply a gaseous pressure internally of said tubular formation as drawn, a control mechanism including a plurality of sensing devices arranged along the drawing path of the tubular member, one said sensing device arranged to control the rate of said draw, the other said sensing device arranged to control the application of said internal pressure, each said sensing device having an actuating connection with a control and attenuator unit individual thereto, said control and attenuator units being interconnected with each other to alternately and repeatedly proportionately balance in minor increments of change both said internal pressure with respect to the rate of draw and the rate of draw with respect to said internal pressure, one of said sensing devices being actuated by a variation in the diameter of the drawn tubular member, the second sensing device arranged to be actuated by a variation in the wall thickness of the drawn tubular member and the actuation of either of said sensing devices operating to concurrently actuate said control and attenuator units.

2. An apparatus in accordance with claim 1 including a chamber enclosing said supported and unsupported tubular glass forms and maintaining a heated flame-free quiescent atmosphere around said forms during their formative period.

3. An apparatus for continuously producing a lineal tubular glass member of extended length including means for continuously initiating an extended tubular form of molten glass supported on and along an extended tubular mandrel, said tubular glass form ending in a mass of molten glass at the draw point end of said mandrel and from which the final tubular glass member is drawn, means to rotate said mandrel and tubular form about an approximate horizontal axis extending through the length thereof to thereby maintain said tubular form and the mass of glass at said draw point, means comprising a series of contiguous radiant heat zones extending along said axis to provide thereby a gradually reduced temperature gradient in and along said tubular glass form throughout its length and also to maintain the temperature of said tubular form constant at any transverse plane along said length and at said draw point, means for continuously drawing an unsupported tubular formation away from said draw point in catenary form, means to continuously supply a gaseous pressure internally of said tubular formation as drawn, a chamber enclosing the said tubular and catenary forms in a heated quiescent atmosphere during the formation of said forms, a control mechanism including a plurality of sensing devices arranged along the drawing path of the tubular member, one said sensing device arranged to control the rate of said draw, the other said sensing device arranged to control the application of said internal pressure, each said sensing device having an actuating connection with a control and attenuator unit individual thereto, said control and attenuator units being interconnected with each other to alternately and repeatedly proportionately balance in minor increments both said internal pressure with respect to the rate of draw and the rate of draw with respect to said internal pressure, one of said sensing devices being actuated by a variation in the diameter of the drawn tubular member, the second sensing device arranged to be actuated by a variation in the wall thickness of the drawn tubular member and the actuation of either said sensing devices operating to concurrently actuate said control and attenuator units.

4. An apparatus for continuously producing a lineal tubular glass member of extended length including means for continuously initiating an extended tubular form of molten glass supported on and along an extended tubular mandrel, said tubular glass form ending in a mass of molten glass at the draw point end of said mandrel and from which the final tubular glass member is drawn, means comprising a series of contiguous radiant heat zones extending along the longitudinal axis of said mandrel to provide a gradually reduced temperature gradient in and along said tubular glass form throughout its length and also to maintain the temperature of said tubular form constant at any transverse plane along said length and at said draw point, means for continuously drawing an unsupported tubular formation away from said mass of glass at said draw point, means to continuously supply a gaseous pressure internally of said tubular formation as drawn, a control mechanism including a plurality of sensing devices arranged along the drawing path of the tubular member, one said sensing device arranged to control the rate of said draw, the other said sensing device arranged to control the application of said internal pressure, each said sensing device having an actuating connection with a control and attenuator unit individual thereto, said control and attenuator units being interconnected with each other to alternately and repeatedly proportionately balance in minor increments of change both said internal pressure with respect to the rate of draw and the rate of draw with respect to said internal pressure, one of said sensing devices being actuated by a variation in the diameter of the drawn tubular member, another sensing device being arranged to be actuated by a variation in the wall thickness of the drawn tubular form and the actuation of either of said devices operating to concurrently actuate said control and attenuator units.

References Cited in the file of this patent
UNITED STATES PATENTS

| | | |
|---|---|---|
| 1,218,598 | Danner | Mar. 6, 1917 |
| 1,519,259 | Hitchcock | Dec. 16, 1924 |
| 1,941,924 | Arrault | Jan. 2, 1934 |
| 2,150,017 | Barnard | Mar. 7, 1939 |
| 2,329,164 | Stuckert et al. | Sept. 7, 1943 |
| 2,659,182 | Argyle | Nov. 17, 1953 |